United States Patent [19]

Maki

[11] Patent Number: 5,729,707
[45] Date of Patent: Mar. 17, 1998

[54] INSTRUCTION PREFETCH CIRCUIT AND CACHE DEVICE WITH BRANCH DETECTION

[75] Inventor: Kazuhiko Maki, Tokyo, Japan

[73] Assignee: Oki Electric Industry Co., Ltd., Tokyo, Japan

[21] Appl. No.: 539,683

[22] Filed: Oct. 5, 1995

[30] Foreign Application Priority Data

Oct. 6, 1994 [JP] Japan .................... 6-242553

[51] Int. Cl.$^6$ ...................... G06F 9/38
[52] U.S. Cl. .............. 395/383; 395/581; 395/582
[58] Field of Search .................... 395/383, 581, 395/582

[56] References Cited

U.S. PATENT DOCUMENTS

| | | | |
|---|---|---|---|
| 4,847,753 | 7/1989 | Matsuo et al. | 395/585 |
| 4,881,170 | 11/1989 | Morisada | 395/383 |
| 4,984,154 | 1/1991 | Hanatani et al. | 395/587 |
| 5,283,873 | 2/1994 | Steely, Jr. et al. | 395/383 |
| 5,327,536 | 7/1994 | Suzuki | 395/585 |
| 5,507,028 | 4/1996 | Liu | 395/383 |
| 5,542,109 | 7/1996 | Blomgren et al. | 395/581 |
| 5,586,278 | 12/1996 | Papworth et al. | 395/582 |

FOREIGN PATENT DOCUMENTS

| | | |
|---|---|---|
| 0 320098A3 | 6/1989 | European Pat. Off. . |
| 23 27 315.6 | 2/1974 | Germany . |
| 58-129660 | 8/1983 | Japan . |
| 63-170740 | 7/1988 | Japan . |
| 2-144626 | 6/1990 | Japan . |
| 3-84630 | 4/1991 | Japan . |
| 4-348430 | 12/1992 | Japan . |
| 5-88891 | 4/1993 | Japan . |

OTHER PUBLICATIONS

Scott McFarling and John Hennessy, *Reducing the Cost of Branches*, 1986, IEEE pp. 396–403.
Johnny K. F. Lee and Alan Jay Smith, *Branch Prediction Strategies and Branch Target Buffer Design*, Jan. 1984, pp. 6–22.
IBM Technical Disclosure Bulletin, *Efficient Scheme to Reduce Over–Prefetching of Instructions for Loading an Instruction Buffer*, 1990, pp. 423–425.

*Primary Examiner*—Krisna Lim
*Attorney, Agent, or Firm*—Rabin, Champagne & Lynt, P.C.

[57] ABSTRACT

In an instruction prefetch circuit, even when a branch instruction is prefetched, the circuit continues a prefetch operation until branching is actually executed. Accordingly, when the branch instruction is a conditional branch instruction and not actually executed, the circuit continues the prefetch operation so that the prefetched instructions are efficiently supplied to a processor. It may be arranged that, when the branch instruction is an unconditional branch instruction, a branch destination address is extracted from the unconditional branch instruction and used as a prefetch address. Accordingly, the circuit continues the prefetch operation even when branching is executed. It may further be arranged that, when the branch instruction is a conditional branch instruction, a branch destination address is extracted from the conditional branch instruction and further a branch prediction is performed. When branching is expected based on the branch prediction, the branch destination address is used as a prefetch address. Accordingly, as long as the branch prediction does not fail, the circuit continues the prefetch operation.

6 Claims, 10 Drawing Sheets

INSTRUCTION PREFETCH CIRCUIT AND CACHE DEVICE WITH BRANCH DETECTION

BACKGROUND OF THE INVENTION

1. Field of the Invention

The present invention relates to an instruction prefetch circuit and a cache device for accelerating the process in an information processing system and the like.

2. Description of the Prior Art

Figure 11:
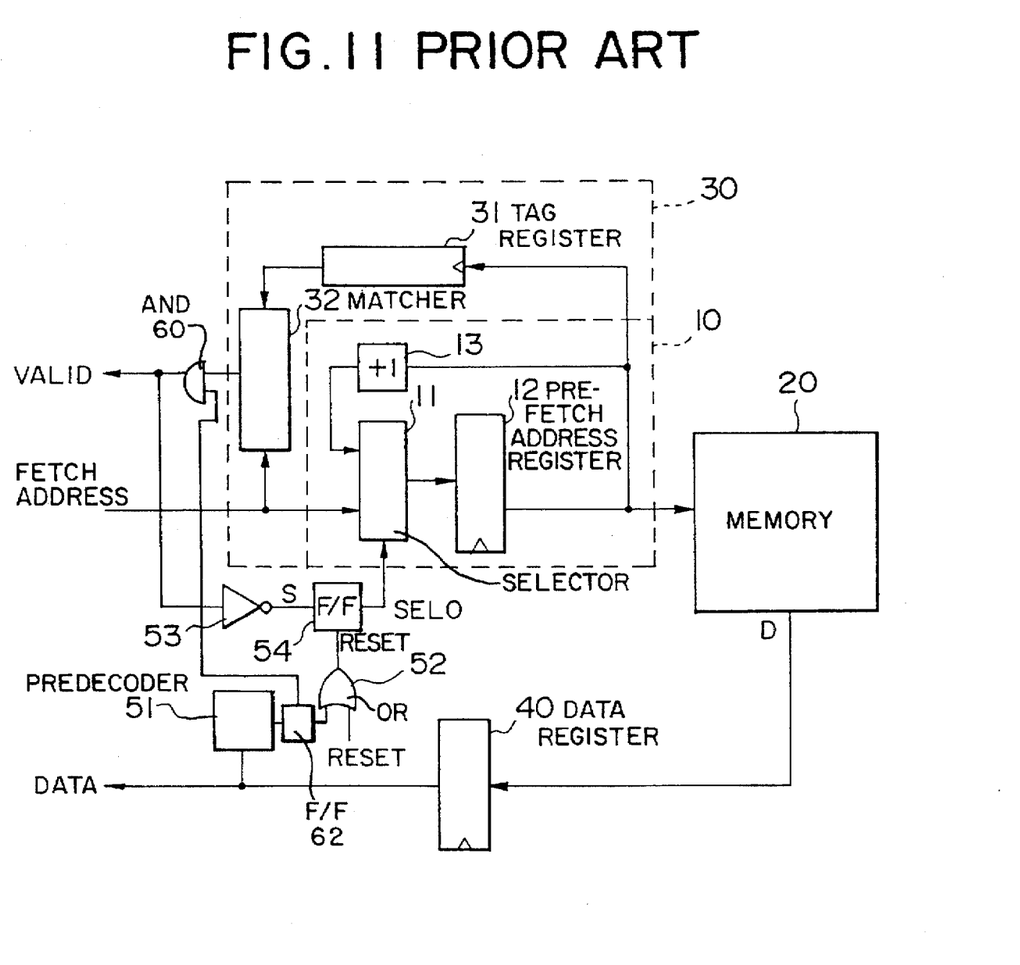
FIG. 11 is a block diagram showing a conventional instruction prefetch circuit.

FIG. 11 is a block diagram showing a conventional instruction prefetch circuit.

The shown instruction prefetch circuit is connected to a CPU (central processing unit) of a microcomputer or the like for fetching in advance, that is, prefetching instruction data D required by the CPU at the next cycle so as to increase the instruction executing speed. The shown instruction prefetch circuit may also apply to a cache device. In this case, the cache device prefetches instruction data D so as to accelerate operations thereof.

In FIG. 11, the instruction prefetch circuit includes an address generating section 10 which receives a signal FA indicative of a fetch address sent from the CPU (not Shown) and generates a prefetch address, a memory 20 which is connected to an output side of the address generating section 10 and stores instructions corresponding to addresses, and a determination signal generating section 30 which is also connected to the output side of the address generating section 10 and outputs to the CPU a signal VALID indicative of whether the instruction data D output to the CPU is valid or invalid. To an output side of the memory 20 is connected a data register 40, as a data sending section, which holds the data D read out from the memory 20 and outputs it to the CPU. A predecoder 51 is connected to an output side of the data register 40. An output side of the predecoder 51 is connected to one of input terminals of a two-input OR gate 52 through flip-flop 62. A reset signal RST is selectively inputted to the other input terminal of the OR gate 52 under the control of the CPU. The instruction prefetch circuit further includes a synchronous RS-FF (reset-set flip-flop) 54 which receives the signal VALID via an inverter 53. An output side of the OR gate 52 is connected to a reset terminal of the RS-FF 54 so that the RS-FF 54 is reset by a reset signal R fed from the OR gate 52. Further, an output SEL0 of the RS-FF 54 is inputted to the address generating section 10.

The address generating section 10 includes a selector 11 having an input terminal which receives the fetch signal FA from the CPU. The address generating section 10 further includes a prefetch address register 12 connected to an output side of the selector 11, and an incrementer 13 which receives an output of the register 12. The incrementer 13 adds 1 (one) to an address outputted from the register 12 and outputs the address incremented by one to another input terminal of the selector 11. The selector 11 further receives the output signal SEL0 from the RS-FF 54 and selects one of the fetch signal FA from the CPU and the output signal from the incrementer 13 depending on the output signal SEL0 for feeding to the register 12. Accordingly, the output signal SEL0 from the RS-FF 54 works as a load selection signal for the register 12. The register 12 is loaded with the selected address outputted from the selector 11 and outputs the loaded address to the memory 20 as a prefetch address.

The determination signal generating section 30 includes a tag register 31 and a matcher 32. The tag register 31 holds the output from the register 12 and outputs it to the matcher 32. The matcher 32 compares the outputted address from the tag register 31 with the matcher address FA from the CPU. If the address outputted from the tag register 31 matches or agrees with the fetch address FA, the marcher 32 and AND gate 60 produce the signal VALID at level "1". On the other hand, if negative, the matcher 32 and AND gate 60 produce the signal VALID at level "0". The signal VALID is sent to the CPU through AND gate 60 which produces the logical combination of the matcher 32 output and the predecoder 51 output through flip-flop 62.

Now, an operation of the instruction prefetch circuit shown in FIG. 11 will be explained hereinbelow with reference to a timing chart shown in FIG. 12.

Figure 12:
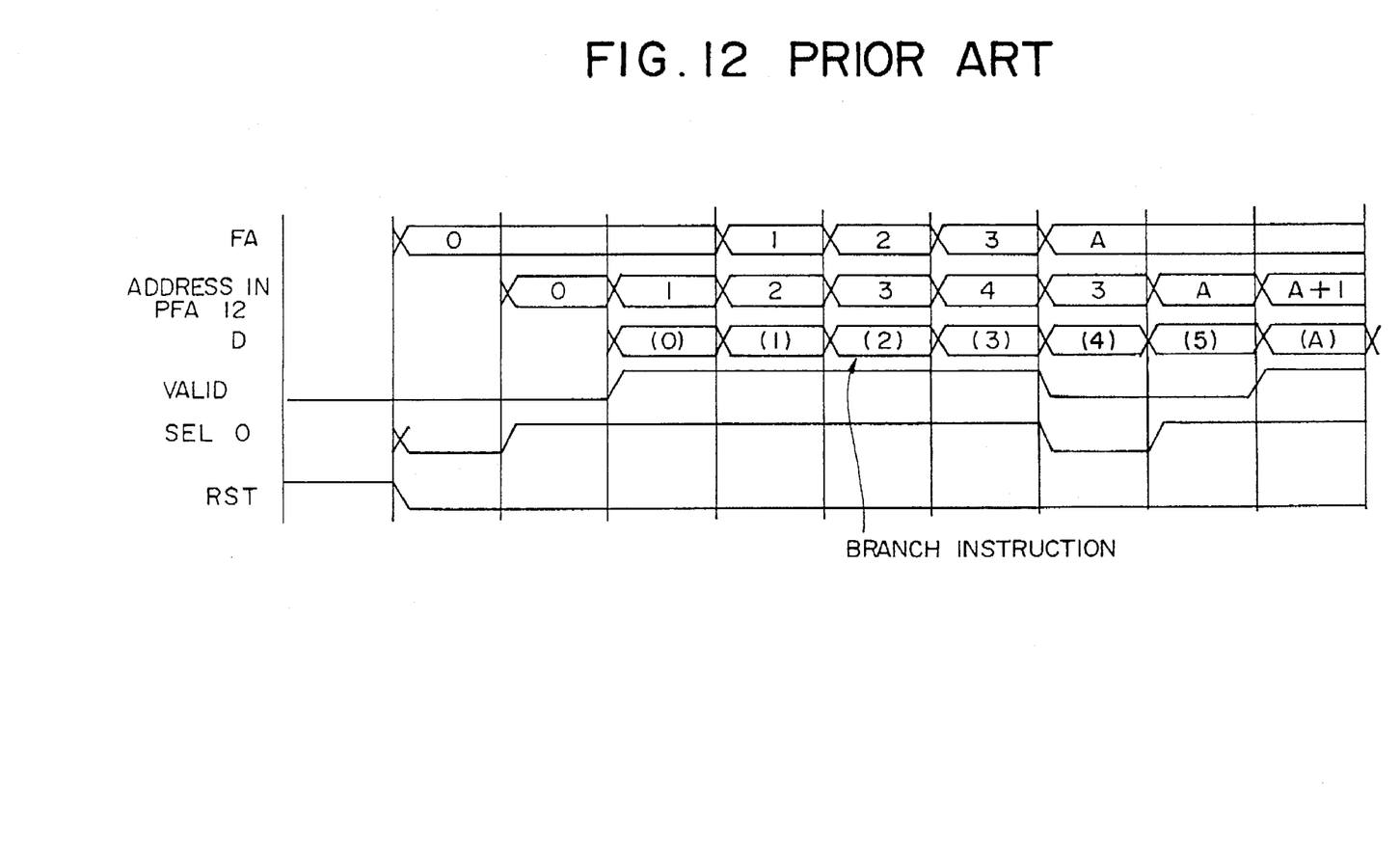
FIG. 12 is a time chart for explaining an operation of the conventional instruction prefetch circuit shown in FIG. 11.

In FIG. 12, the fetch signal FA, the prefetch address loaded in the register 12, the instruction data D sent from the register 40 and the signals VALID, SEL0 and RST are shown. When the reset signal RST is "1", the signal SEL0 of the RS-FF 54 working as the load selection signal for the register 12 is reset to "0". At this stage, the register 40 does not output effective data. When the reset signal RST becomes "0", the fetch signal FA is loaded in the register 12. While the selection signal SEL0 is "1", the circuit of FIG. 11 operates in a prefetch mode so that the register 12 continues to be loaded with the incremented addresses. The memory 20 outputs to the register 40 the data D corresponding to the address inputted from the register 12.

If the instruction data D corresponding to (2) in FIG. 12 is a branch instruction, the predecoder 51 detects it from the output of the register 40 and the prefetch mode is released. Thereafter, an address A representative of a branch destination address appears in the fetch signal FA from the CPU. The branch destination address A is loaded in the register 12 and the circuit starts to operate in the prefetch mode again as seen from FIG. 12.

However, the foregoing conventional instruction prefetch circuit has the following problem:

The prefetch operation of the circuit is stopped even when the prefetched instruction detected by the predecoder 51 is a conditional branch instruction, to say nothing of an unconditional branch instruction. As a result, even when the conditional branch instruction is not established or executed, the prefetch operation is once stopped so that a waiting time is unnecessarily caused to lower the processing performance of the CPU.

SUMMARY OF THE INVENTION

Therefore, it is an object of the present invention to provide an improved instruction prefetch circuit or cache device.

According to one aspect of the present invention, an instruction prefetch circuit comprises a memory prestoring instructions to be used in a processor, the memory prestoring the instructions corresponding to addresses; address generating means for incrementing a first instruction address inputted from the processor so as to generate a prefetch address for sending to the memory; data sending means for reading out the instruction corresponding to the prefetch address from the memory and for sending the read-out instruction to the processor; determination signal generating means for detecting whether or not the prefetch address agrees with a second instruction address inputted from the processor after the first instruction address, the determination signal generating means supplying to the processor a determination signal indicative of the instruction sent from the data sending means being valid when the prefetch"

address agrees with the second instruction address, while supplying to the processor a determination signal indicative of the instruction sent from the data sending means being invalid when the prefetch address disagrees with the second instruction address; and selection signal generating means for sending a selection signal to the address generating means, the selection signal causing the address generating means to select the second instruction address as a new prefetch address other than an address derived by incrementing the first instruction address, only upon change of the determination signal from valid to invalid.

According to another aspect of the present invention, an instruction prefetch circuit comprises a memory prestoring instructions to be used in a processor, the memory prestoring the instructions corresponding to addresses; address generating means for incrementing a first instruction address inputted from the processor so as to generate a prefetch address for sending to the memory; data sending means for reading out the instruction corresponding to the prefetch address from the memory and for sending the read-out instruction to the processor; determination signal generating means for detecting whether or not the prefetch address agrees with a second instruction address inputted from the processor after the first instruction address, the determination signal generating means supplying to the processor a determination signal indicative of the instruction sent from the data sending means being valid when the prefetch address agrees with the second instruction address, while supplying to the processor a determination signal indicative of the instruction sent from the data sending means being invalid when the prefetch address disagrees with the second instruction address; means for detecting that the instruction sent from the data sending means is an unconditional branch instruction; and means for extracting a branch destination address from the unconditional branch instruction; the address generating means sending the branch destination address to the memory as a new prefetch address when the instruction sent from the data sending means is the unconditional branch instruction.

According to another aspect of the present invention, an instruction prefetch circuit comprises a memory prestoring instructions to be used in a processor, the memory prestoring the instructions corresponding to addresses; address generating means for incrementing a first instruction address inputted from the processor so as to generate a prefetch address for sending to the memory; data sending means for reading out the instruction corresponding to the prefetch address from the memory and for sending the read-out instruction to the processor; determination signal generating means for detecting whether or not the prefetch address agrees with a second instruction address inputted from the processor after the first instruction address, the determination signal generating means supplying to the processor a determination signal indicative of the instruction sent from the data sending means being valid when the prefetch address agrees with the second instruction address, while supplying to the processor a determination signal indicative of the instruction sent from the data sending means being invalid when the prefetch address disagrees with the second instruction address; means for detecting that the instruction sent from the data sending means is a conditional branch instruction instructing a conditional branch; means for extracting a branch destination address from the conditional branch instruction; prediction means for predicting whether or not the conditional branch is actually executed; selection means for selecting, based on the branch prediction, one of an address derived by incrementing the first instruction address and the branch destination address; and means for outputting, based on a signal indicative of whether the branch prediction fails or not, one of the address selected by the selection means and a third instruction address being inputted from the processor, to the address generating means as a prefetch address.

It may be arranged that the prediction means extracts a branch prediction bit in an instruction field of the conditional branch instruction and uses it as a prediction value.

It may be arranged that the prediction means uses a random value as a prediction value.

It may be arranged that the prediction means includes a table storing a past branch history of the conditional branch instruction and derives a prediction value based on the past branch history.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

First Embodiment

Figure 1:
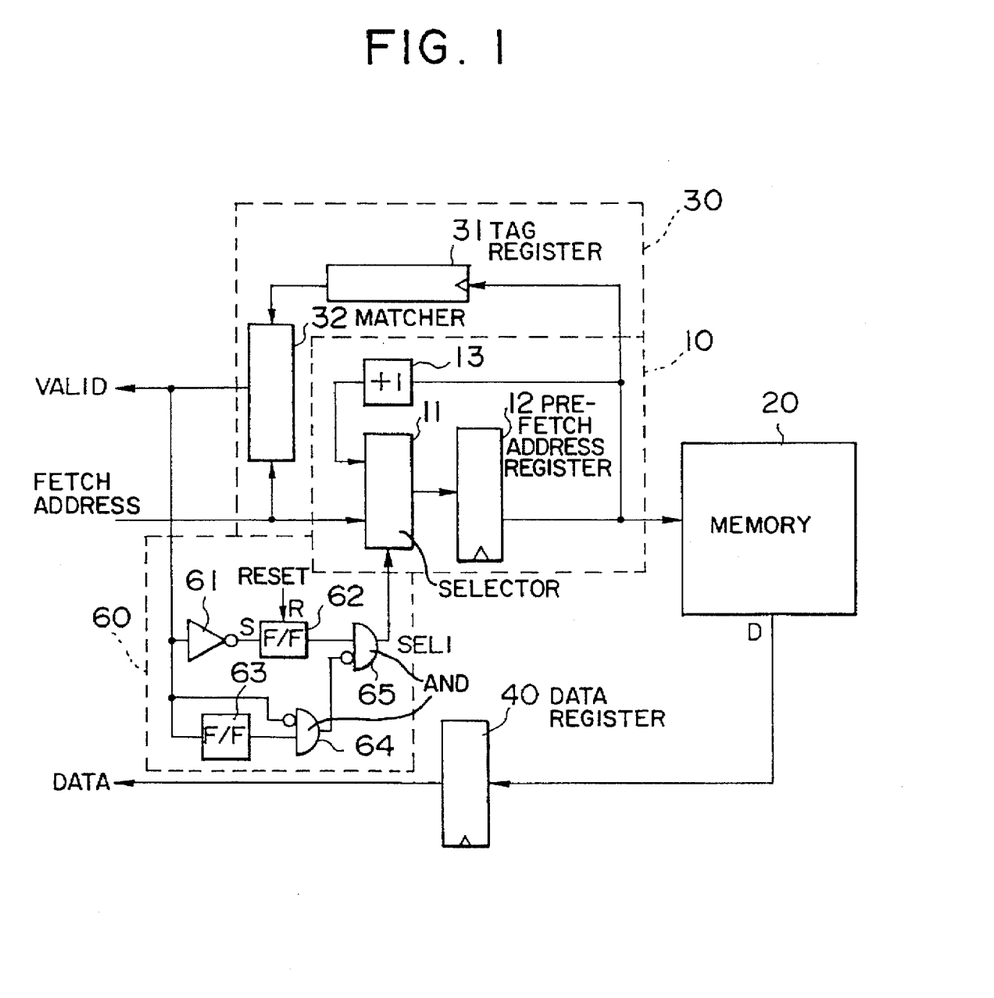
FIG. 1 is a block diagram showing an instruction prefetch circuit according to a first preferred embodiment of the present invention.

FIG. 1 is a block diagram showing an instruction prefetch circuit according to a first preferred embodiment of the present invention. In FIG. 1, the same or like elements are represented by the same symbols as those in FIG. 11.

Like the circuit shown in FIG. 11, the instruction prefetch circuit of FIG. 1 includes an address generating section 10 which receives a signal FA indicative of a fetch instruction address sent from a CPU (not shown) and generates a prefetch address, a memory 20 which is connected to an output side of the address generating section 10 and stores instructions, to be used in the CPU, corresponding to addresses, a determination signal generating section 30 which is also connected to the output side of the address generating section 10 and outputs to the CPU a signal VALID indicative of whether the instruction data D outputted to the CPU is valid or invalid, and a data register 40 which is connected to an output side of the memory 20 and holds the data D read out from the memory 20 for feeding to the CPU.

In the instruction prefetch circuit of this embodiment, selection signal generating means 60 is provided instead of the predecoder 51 and the associated elements in FIG. 11. The selection signal generating means 60 produces a selection signal SEL1 which changes its level upon change of the signal VALID from "valid" to "invalid" so as to switch an address to be loaded at the address generating section 10 to the fetch address FA sent from the CPU, which will be described later in detail.

The address generating section 10 includes a selector 11 having an input terminal which receives the fetch signal FA from the CPU. The address generating section 10 further includes a prefetch address register 12 connected to an output side of the selector 11, and an incrementer 13 which receives an output of the register 12. The incrementer 13 adds 1 (one) to an address outputted from the register 12 and outputs the address incremented by one to another input terminal of the selector 11. The selector 11 further receives the output signal SEL1 and selects one of the fetch signal FA from the CPU and the output signal from the incrementer 13 depending on the output signal SEL1 for feeding to the register 12. The register 12 is loaded with the selected address outputted from the selector 11 and outputs the loaded address to the memory 20 as a prefetch address.

The determination signal generating section 30 includes a tag register 31 and a matcher 32. The tag register 31 holds the output from the register 12 and outputs it to the matcher 32. The matcher 32 compares the outputted address from the tag register 31 with the fetch address FA from the CPU. If the address outputted from the tag register 31 matches or agrees with the fetch address FA, the matcher 32 produces the signal VALID at level "1". On the other hand, if negative, the martcher 32 produces the signal VALID at level "0". The signal VALID is sent to the CPU.

The selection signal generating means 60 includes an RS-FF 62 which is inputted with the signal VALID via an inverter 61, and a D-FF 63 (data-delay flip-flop) which is directly inputted with the signal VALID. The RS-FF 62 has a reset terminal R which is selectively inputted with a reset signal RST for setting a reset or set mode. On the other hand, the D-FF 63 is provided for latching a state of the signal VALID and has an output terminal connected to one of input terminals of a two-input AND gate 64. The other input terminal of the AND gate 64 is inputted with an inverted value of the signal VALID. An output signal of the AND gate 64 is inverted and inputted to one of input terminals of a two-input AND gate 65. Further, an output terminal of the RS-FF 62 is connected to the other input terminal of the AND gate 65. The selection signal SEL1 is supplied to the selector 11 from the AND gate 65.

Now, an operation of the instruction prefetch circuit shown in FIG. 1 will be explained hereinbelow with reference to a time chart shown in FIG. 2.

Figure 2:
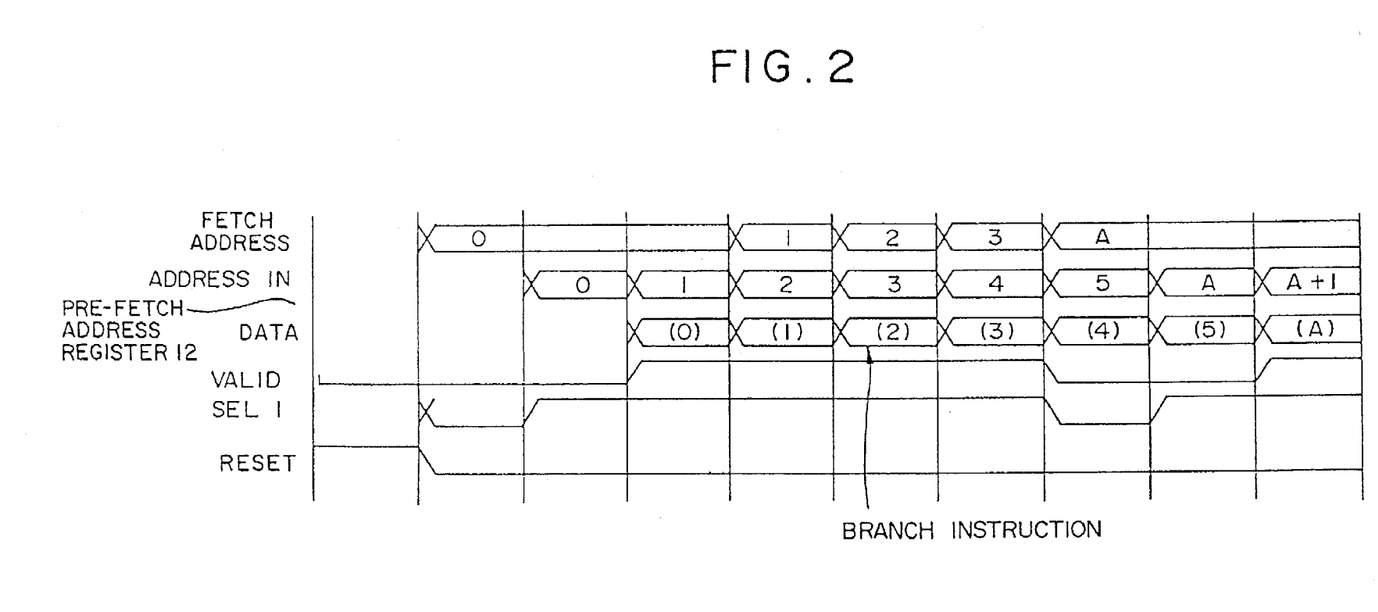
FIG. 2 is a time chart for explaining an operation of the instruction prefetch circuit shown in FIG. 1.

In FIG. 2, the fetch signal FA, the prefetch address loaded in the register 12, the instruction data D sent from the register 40 and the signals VALID, SEL1 and RST are shown. When the reset signal RST is "1", the selection signal SEL1 of the AND gate 65 is reset to "0". At this stage, the register 40 does not output effective data. When the reset signal RST becomes "0", the fetch signal FA is loaded in the register 12 and the selection signal SEL1 is set to "1". While the selection signal SEL1 is "1", the circuit of FIG. 1 operates in a prefetch mode so that the register 12 continues to be loaded with the incremented addresses. The memory 20 outputs to the register 40 the data D corresponding to the address inputted from the register 12.

If the instruction data D corresponding to (2) in FIG. 2 is an unconditional branch instruction, or a conditional branch instruction and the branching is executed, the fetch address FA from the CPU and the address outputted from the register 12 differ from each other so that the matcher 32 changes a level of the signal VALID from "1" to "0" which represents "invalid". Specifically, when the branching is executed, the fetch address FA becomes A while the address outputted from the register 12 becomes 4 in FIG. 2 so that both addresses differ from each other to cause the matcher 32 to change the level of the signal VALID from "1" to "0". This change in level of the signal VALID is detected by the operations of the D-FF 63 and the AND gate 64 so as to forcibly change the selection signal SEL1 from "1" to "0" at one cycle as shown in FIG. 2. Specifically, it is so arranged that, when the signal VALID is changed from "1" to "0", a level at the input terminal of the AND gate 64 which receives the inverted value of the signal VALID changes from "0" to "1", while a level at the input terminal of the AND gate 64 connected to the D-FF 63 remains "1" at one cycle due to the latching operation of the D-FF 63. Thus, a level at the input terminal of the AND gate 65 connected to the AND gate 64 becomes "0" while a level at the input terminal of the AND gate 65 connected to the RS-FF 62 remains "1" so that the selection signal SEL1 becomes "0" at one cycle as shown in FIG. 2.

Accordingly, the selector 11 selects the fetch address FA for feeding to the register 12 so that the register 12 is loaded with the address A and the prefetch operation is performed again as shown in FIG. 2. As appreciated, when the instruction data D corresponding to (2) in FIG. 2 is the conditional branch instruction and the branching is not executed, the signal VALID continues to represent "valid" as opposed to the foregoing description so that the prefetch operation continues to be performed normally.

In the first preferred embodiment, as described above, even when the branch instruction is prefetched, the prefetch operation continues until discrepancy between the fetch address FA and the address outputted from the register 12 actually occurs to cause the matcher 32 to change the signal VALID from "valid" to "invalid". Accordingly, when the instruction is the conditional branch instruction and the branching is not executed, the instruction can be fed to the, CPU efficiently as compared with the conventional instruction prefetch circuit shown in FIG. 11. Further, since the instruction does not need to be predecoded as in the circuit of FIG. 11, the hardware can be simplified and the process delay can be avoided. Further, when the circuit shown in FIG. 1 is applied to an advance-writable cache device, since update can be continued to increase a hit ratio of the device, the performance thereof is improved.

Second Embodiment

Figure 3:
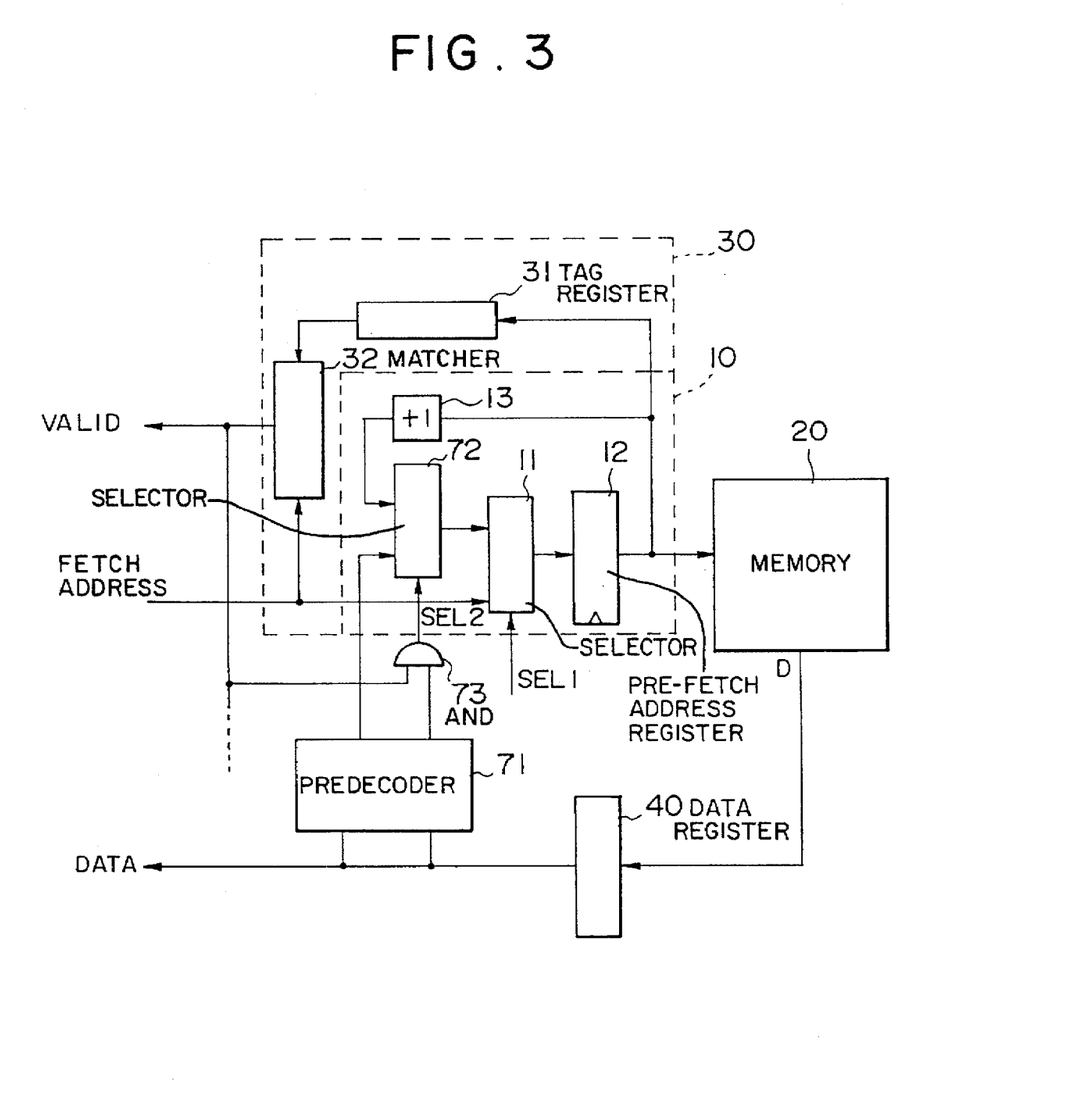
FIG. 3 is a block diagram showing an instruction prefetch circuit according to a second preferred embodiment of the present invention.

FIG. 3 is a block diagram showing an instruction prefetch circuit according to a second preferred embodiment of the present invention. In FIG. 3, the same or like elements are represented by the same symbols as those in FIG. 1.

As shown in FIG. 3, the instruction prefetch circuit of this embodiment further includes a predecoder 71, a selector 72 and an AND gate 73. The other structure is essentially the same as that shown in FIG. 1.

The predecoder 71 is connected to an output side of the data resister 40. The predecoder 71 is provided for detecting that the prefetched instruction D from the data register 40 is an unconditional branch instruction and for extracting a branch destination address from the unconditional branch instruction. The selector 72 is provided between an output side of the incrementer 13 and an input side of the selector 11. The selector 72 receives the incremented address from the incrementer 13 and further receives the branch destination address from the predecoder 71 when the prefetched instruction D is the unconditional branch instruction. The selector 72 selects one of them for feeding to the selector 11.

A detection signal, indicative of whether the instruction data D is the unconditional branch instruction, of the predecoder 71 is inputted to one of input terminals of a two-input AND gate 73. To the other input terminal of the AND gate 73 is inputted the signal VALID. The AND gate 73 outputs a selection signal SEL2 to the selector 72 which switches selection between the addresses from the incrementer 13 and the predecoder 71 based on the selection signal SEL2. On the other hand, the selection signal SEL1 is inputted to the selector 11. In this preferred embodiment; the selection signal SEL1 is produced using the selection signal generating means 60 in the first preferred embodiment, but may be produced using the predecoder 51 in the conventional circuit shown in FIG. 11.

Figure 4:
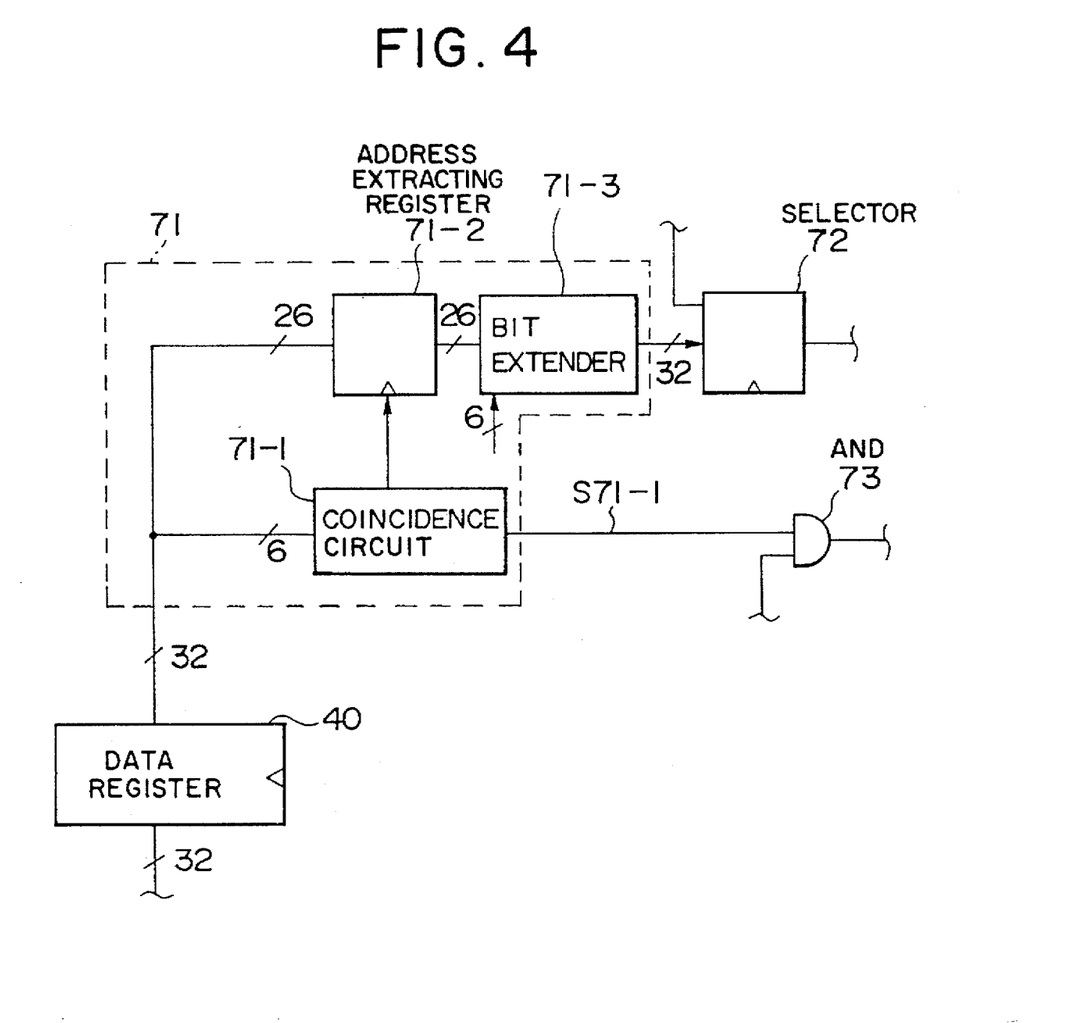
FIG. 4 is a block diagram showing a structure of a predecoder shown in FIG. 3.

FIG. 4 is a block diagram showing a structure of the predecoder 71.

The predecoder 71 includes a coincidence circuit 71-1. The coincidence circuit 71-1 extracts, for example, 6 bits representing a feature of the instruction outputted from the data register 40 for detecting coincidence with a preselected bit feature of the unconditional branch instruction. The coincidence circuit 71-1 outputs a coincidence signal S71-1 as a result of the detection to the AND gate 73. The predecoder 71 further includes an address extracting register 71-2 and a bit extender 71-3. The register 71-2 is inputted with, for example, 26 bits showing an address of an instruction field of the instruction outputted from the data register 40 so as to fetch a branch destination address designated by the instruction when the signal S71-1 indicates "coincidence". A stream of 26 bits outputted from the register 71-2 is extended to a stream of 32 bits by the bit extender so as to be fed to the selector 72.

Now, an operation of the instruction prefetch circuit shown in FIG. 3 will be explained hereinbelow with reference to a time chart shown in FIG. 5.

Figure 5:
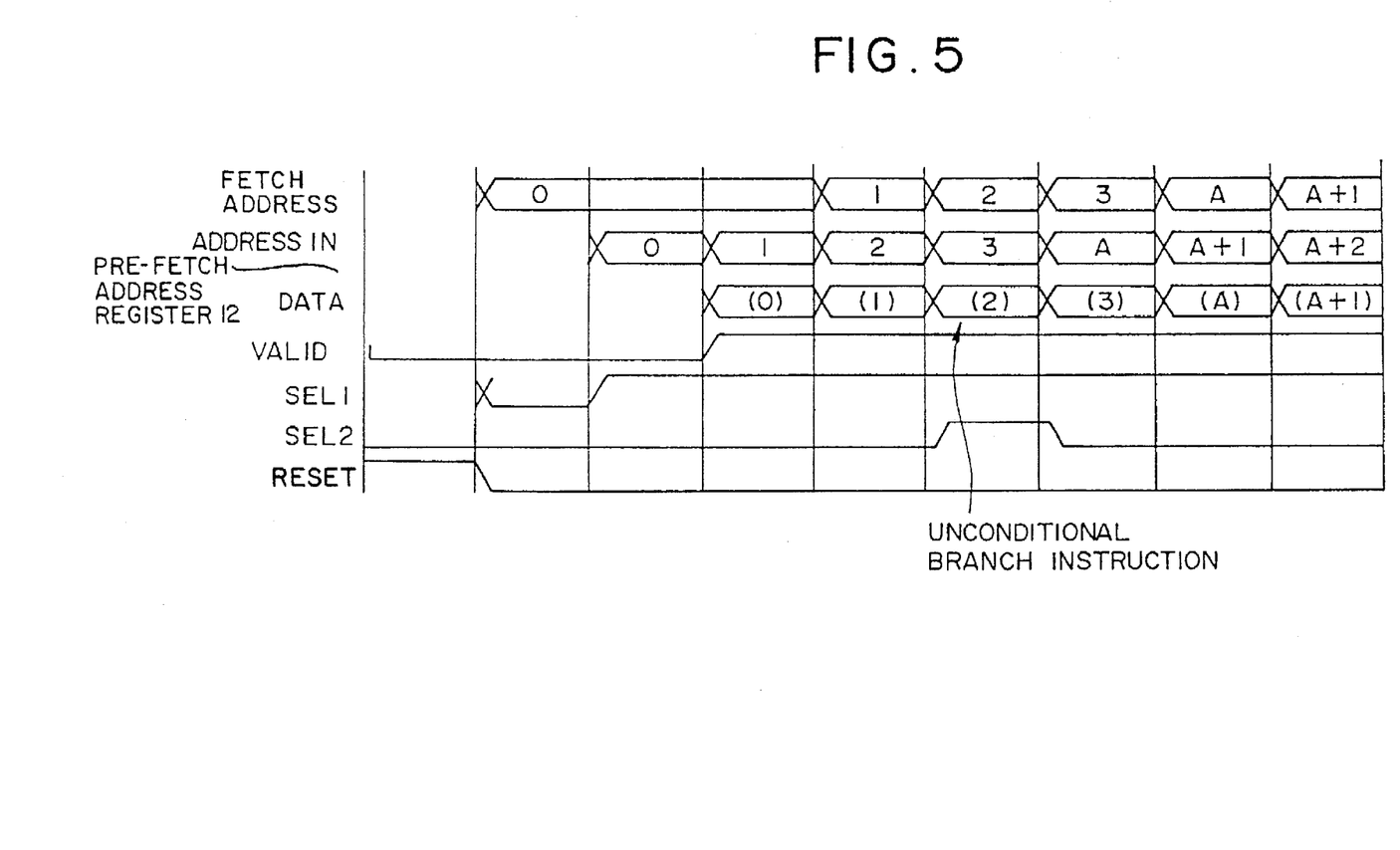
FIG. 5 is a time chart for explaining an operation of the instruction prefetch circuit shown in FIG. 3.

In FIG. 5, when, for example, the instruction data D corresponding to (2) is the unconditional branch instruction, the predecoder 71 detects it and the AND gate 73 outputs the corresponding selection signal SEL2 to the selector 72. Simultaneously, the predecoder 71 extracts the branch destination address designated by that unconditional branch instruction and feeds it to the selector 72. The selector 72 selects the branch destination address based on the selection signal SEL2 for feeding to the selector 11. Accordingly, the selector 11 outputs the branch destination address so that the register 12 is loaded with the branch destination address for feeding to the memory 20, the incrementer 13 and the tag register 31.

In this preferred embodiment, the instruction prefetch circuit continues to perform the prefetch operation even when the unconditional branch instruction is prefetched. Specifically, the prefetch operation is performed using the branch destination address designated by the unconditional branch instruction. As appreciated, when the instruction data D corresponding to (2) in FIG. 5 is the conditional branch instruction, the instruction prefetch circuit of this embodiment works essentially in the same manner as that of the foregoing first preferred embodiment. Further, when the circuit shown in FIG. 3 is applied to an advance-writable cache device, since update can be continued to increase a hit ratio of the device even when an unconditional branch instruction is prefetched, the performance thereof is improved.

Third Embodiment

Figure 6:
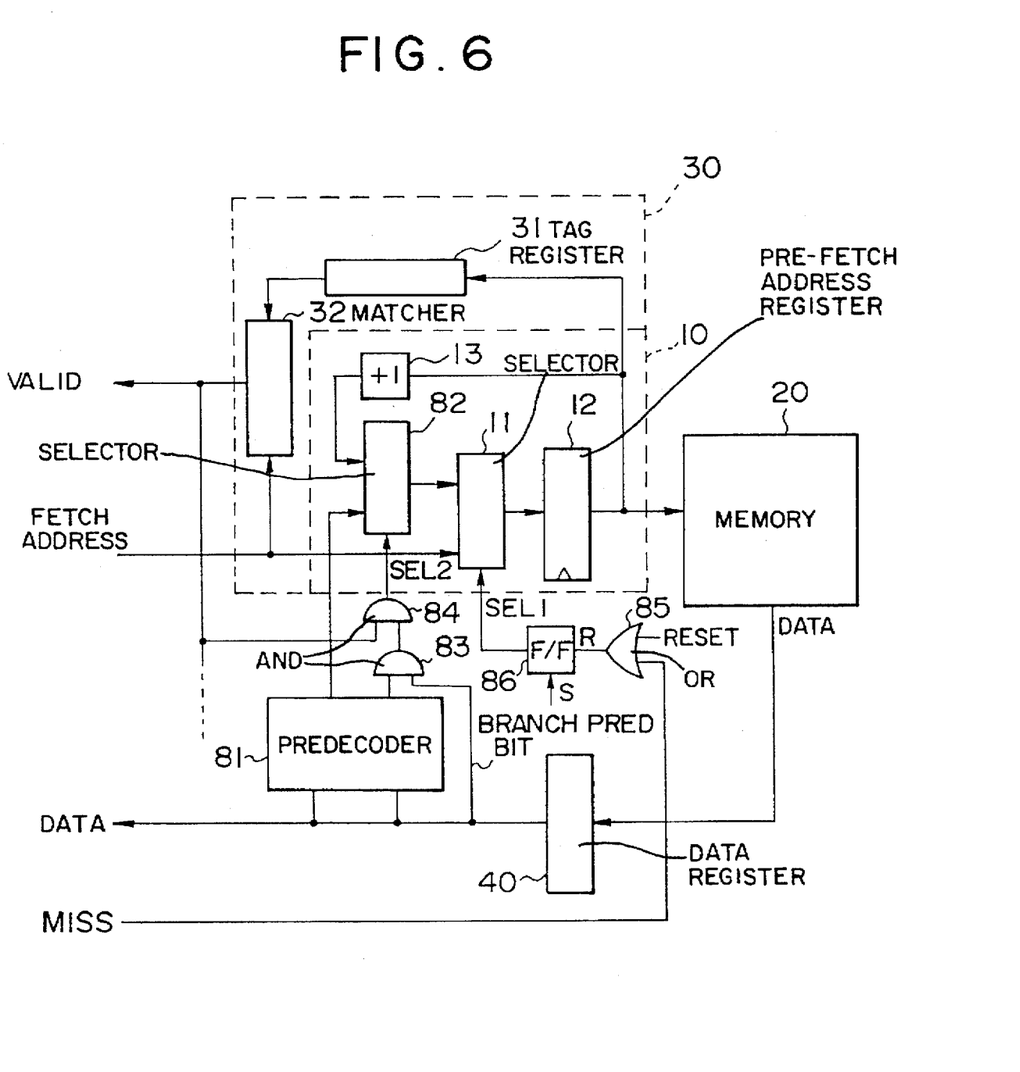
FIG. 6 is a block diagram showing an instruction prefetch circuit according to a third preferred embodiment of the present invention.

FIG. 6 is a block diagram showing an instruction prefetch circuit according to a third preferred embodiment of the present invention. In FIG. 6, the same or like elements are represented by the same symbols as those in FIG. 3.

As shown in FIG. 6, the instruction prefetch circuit of this embodiment includes the address generating section 10, the memory 20, the determination signal generating section 30, and the data register 40 like the circuit shown in FIG. 3. The circuit of this embodiment includes a predecoder 81 and a selector 82. The predecoder 81 is connected to an output side of the data resister 40. The predecoder 81 is provided for detecting that the prefetched instruction D from the data register 40 is a conditional branch instruction and for extracting a branch destination address from the conditional branch instruction. The selector 82 is provided between an output side of the incrementer 13 and an input side of the selector 11. The selector 82 receives the incremented address from the incrementer 13 and further receives the branch destination address from the predecoder 81 when the prefetched instruction D is the conditional branch instruction. The selector 82 selects one of them for feeding to the selector 11.

A detection signal, indicative of whether the instruction data D is the conditional branch instruction, of the predecoder 81 is inputted to one of input terminals of a two-input AND gate 83. To the other input terminal of the AND gate 83 is inputted a given branch prediction bit of the prefetched instruction D outputted from the data register 40. An output of the AND gate 83 and the signal VALID are inputted to input terminals of a two-input AND gate 84. The AND gate 84 outputs a selection signal SEL2 to the selector 82 which switches selection between the addresses from the incrementer 13 and the predecoder 81 based on the selection signal SEL2. On the other hand, a selection signal SEL1 is inputted to the selector 11. In this preferred embodiment, since prediction is performed whether the conditional branch instruction is actually executed or not, a signal MISS is further provided for loading the fetch address FA when the prediction fails. The signal MISS and the reset signal RST are inputted to an OR gate 85 an output of which is, in turn, inputted to a reset terminal R of a synchronous RS-FF 86. The RS-FF 86 outputs the selection signal SEL1 to the selector 11 which switches selection between the address from the selector 82 and the fetch address FA based on the selection signal SEL1. As an input signal to a set terminal S of the RS-FF 86, the mode setting signal SEL1 at the preceding cycle is used.

Figure 7:
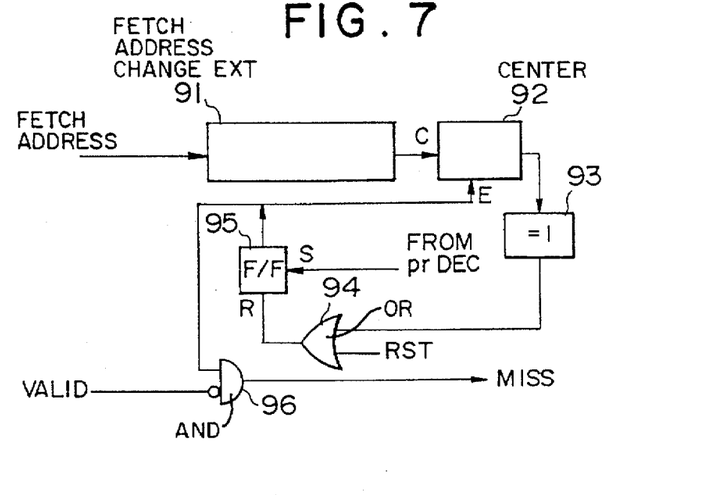
FIG. 7 is a block diagram showing a circuit for generating a signal MISS which is used in the instruction prefetch circuit shown in FIG. 6.

FIG. 7 is a block diagram showing a circuit for generating the signal MISS.

This circuit includes an FA change extracting section 91 which receives the fetch address FA and extracts its change, a counter 92 for counting an output of the FA change extracting section 91, that is, the number of the fetch addresses FA sent from the CPU, a coincidence circuit 93 for detecting that an output of the counter 92 is "1", an OR gate 94 for deriving the logical sum of an output of the coincidence circuit 93 and the reset signal RST, and a synchronous RS-FF 95 having a reset terminal R which is inputted with an output of the OR gate 94. These elements cooperatively work for setting a timing of the signal MISS. The RS-FF 95 has a set terminal S which is inputted with the detection result from the predecoder 81, that is, the detection signal indicative of whether the instruction data D is the conditional branch instruction. An output side of the RS-FF 95 is connected to an enable terminal E of the counter 92 and to one of input terminals of a twoinput AND gate 96. An inverted value of the signal VALID is inputted to the other input terminal of the AND gate 96. The signal MISS is outputted from the AND gate 96. The circuit of FIG. 7 checks whether the branch prediction has failed or not, and produces the signal MISS when it turns out that the branch prediction has failed.

Now, an operation of the instruction prefetch circuit shown in FIG. 6 will be described hereinbelow.

When the conditional branch instruction is detected while operating in the prefetch mode, it is estimated based on the branch prediction bit in the instruction field of the instruction D whether the branching will be executed. The branch prediction bit is prepared according to the known prediction algorithm when a compiler or programmer makes a program. According to an instruction set, the branch prediction bit may be in the form of a sign bit indicative of a direction (plus or minus direction) of the branch destination address.

When the conditional branch instruction is detected as noted above, the corresponding detection signal is fed from the predecoder 81 to the set terminal S of the RS-FF 95 so as to set the RS-FF 95 and thus to set the counter 92 for counting the number of the fetch addresses FA sent from the CPU. Thereafter, since, in this embodiment, the branch destination address appears, if the branching is executed, in the second fetch address FA from the fetch address FA indicative of the corresponding conditional branch instruction, the RS-FF 95 is reset when the counter value becomes "1" Accordingly, if the signal VALID becomes "0", meaning "invalid", while the RS-FF 95 remains to be set and thus holds the corresponding input terminal of the AND gate 96 at level "1", the signal MISS is outputted from the AND date 96 for resetting the RS-FF 86 so that the selector 11 selects the fetch address FA sent from the CPU.

As appreciated, as long as the branch prediction is correct, the instruction prefetch circuit of FIG. 6 performs the operation which is essentially the same as that shown in FIG. 5. Specifically, the predecoder 81 fetches the branch destination address designated by the prefetched conditional branch instruction and feeds it to the selector 82. The selector 82 selects the branch destination address based on the selection signal SEL2 for feeding to the selector 11. Accordingly, the selector 11 outputs the branch destination address so that the register 12 is loaded with the branch destination address for feeding to the memory 20, the incrementer 13 and the tag register 31.

In this preferred embodiment, the instruction prefetch circuit continues to perform the prefetch operation irrespective of whether the prefetched conditional branch instruction is executed or not, as long as the branch prediction does not fail. Further, when this preferred. embodiment is combined with the foregoing second preferred embodiment, the instruction prefetch circuit is capable of continuing the prefetch operation under any of the stored instructions as long as the branch prediction does not fail. When the circuit shown in FIG. 6 is applied to an advance-writable cache device, since update can be continued to increase a hit ratio of the device even when a conditional branch instruction is prefetched, the performance thereof is improved.

Fourth Embodiment

Figure 8:
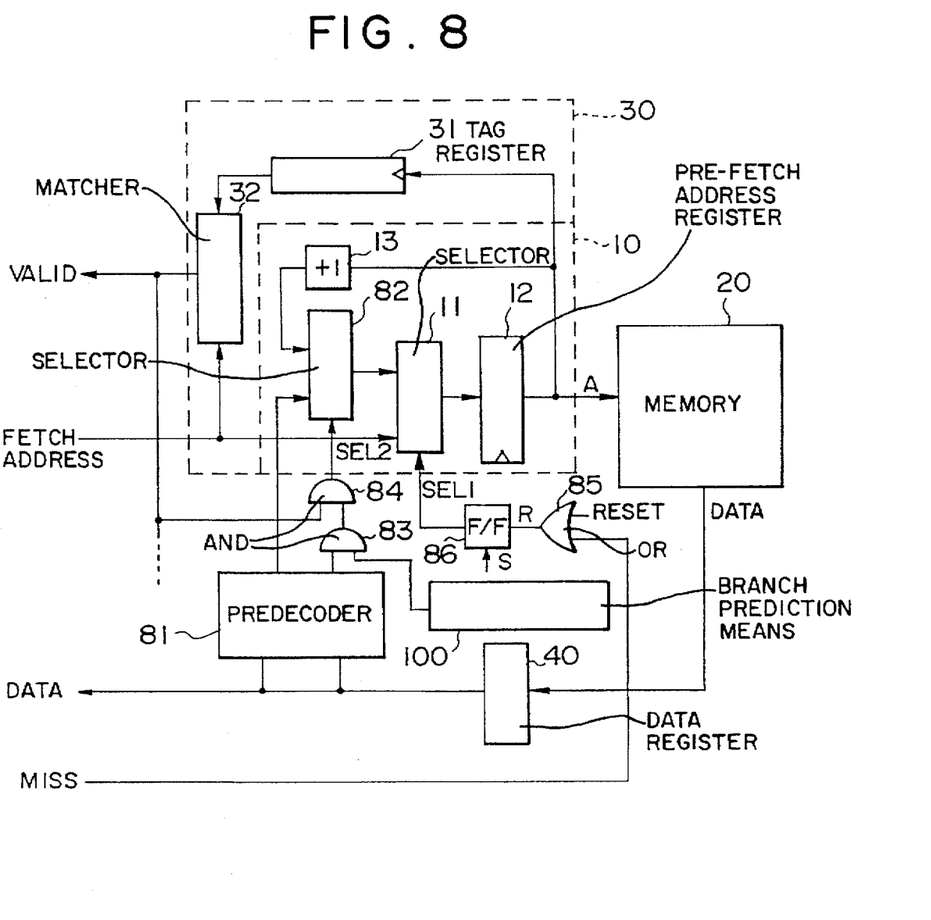
FIG. 8 is a block diagram showing an instruction prefetch circuit according to a fourth preferred embodiment of the present invention.

FIG. 8 is a block diagram showing an instruction prefetch circuit according to a fourth preferred embodiment of the present invention. In FIG. 8, the same or like elements are represented by the same symbols as those in FIG. 6.

In the foregoing third preferred embodiment, the branch prediction bit is used as a prediction value for the branch prediction. On the other hand, in this preferred embodiment, branch prediction means 100 is provided for the branch prediction. Specifically, in FIG. 8, an output of the branch prediction means 100 is inputted to one of the input terminals of the AND gate 83 instead of the branch prediction bit. The other structure is essentially the same as that shown in FIG. 6.

Figure 9:
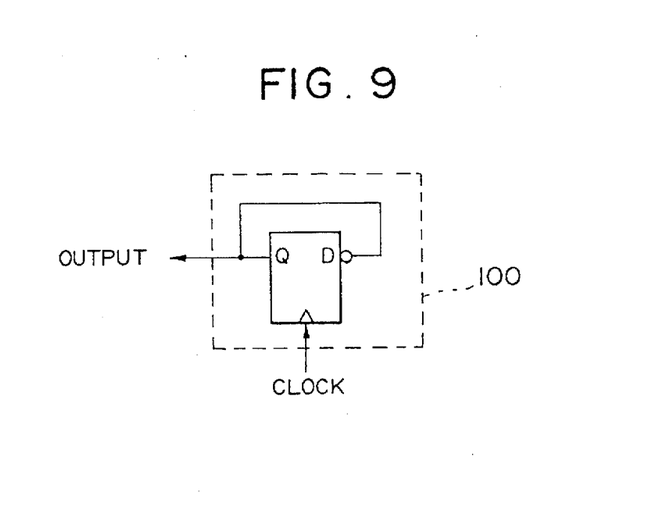
FIG. 9 is a block diagram showing branch prediction means used in the instruction prefetch circuit shown in FIG. 8.

FIG. 9 is a block diagram showing the branch prediction means 100. The branch prediction means 100 is in the form of a random value generator constituted by a D-FF. An output terminal Q of the D-FF is connected to a data terminal D thereof. The branch prediction is performed using an output of the random value generator as a prediction value.

Specifically, the output of the random value generator represents a random value of "1" or "0" depending on a timing. Since the mean probability of "1" or "0" in this random value generator is 0.5, a hit ratio becomes higher rather than fixing a prediction value to "1" or "0" in case determination of the prediction value is difficult.

As appreciated, the instruction prefetch circuit shown in FIG. 8 performs the prefetch operation similar to that of the foregoing third preferred embodiment. In case of an instruction set with no branch prediction bit in the instruction field, the branch prediction can be achieved with the simplified hardware in this preferred embodiment.

Fifth Embodiment

Figure 10:
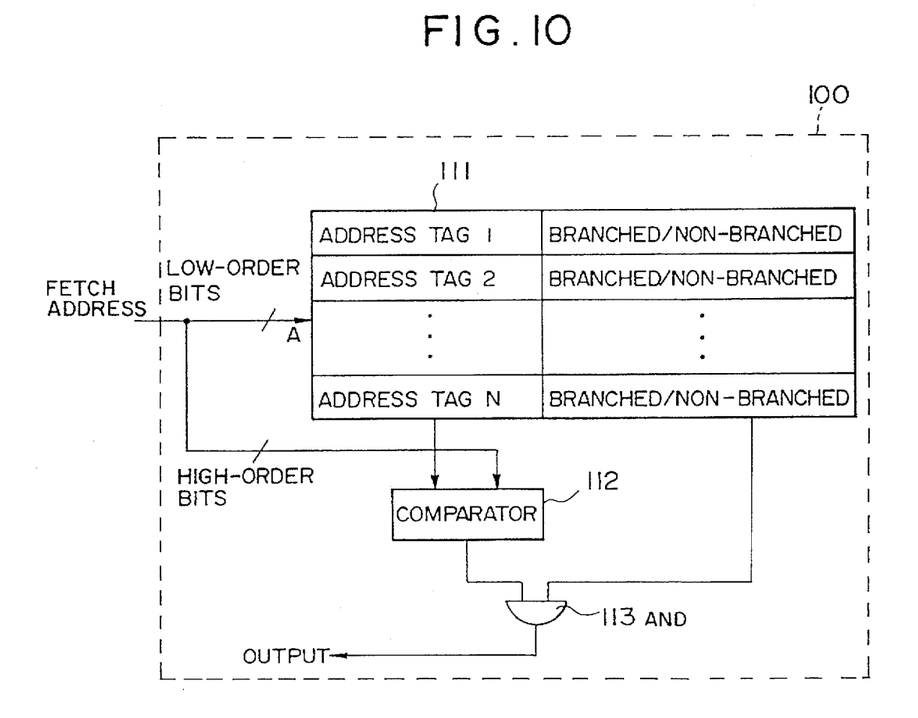
FIG. 10 is a diagram showing branch prediction means used in an instruction prefetch circuit according to a fifth preferred embodiment of the present invention.

FIG. 10 is a diagram showing another example of the branch prediction means 100 according to a fifth preferred embodiment of the present invention.

As shown in FIG. 10, in this preferred embodiment, the branch prediction means 100 includes a history table memory 111, a comparator 112 and a two-input AND gate 113. The history table memory 111 stores past histories of "branched" or "non-branched" in terms of address tags I~N. The history table memory 111 is inputted with low-order bits of the fetch address FA for outputting a corresponding address tag and a past history thereof. The comparator 112 is inputted with high-order bits of the fetch address FA and the address tag outputted from the history table memory 111 for comparison therebetween. A result of the comparison at the comparator 112 is inputted to one of input terminals of the AND gate 113. To the other input terminal of the AND gate 113 is inputted the corresponding past history outputted from the history table memory 111. As appreciated, an output of the AND gate 113 represents a branch prediction value and is fed to one of the input terminals of the AND gate 83 in FIG. 8.

In this embodiment, even in case of an instruction set with no branch prediction bit in the instruction field, the branch prediction can be performed based on the past branch history. In FIG. 10, since it is impractical to provide the history table memory 111 for all the addresses, the so-called set-associative mode is adopted. Naturally, it is more efficient to adopt the so-called full-associative mode. When the fetch address FA is not found in the history table memory 111, it is arranged that "non-branched" is outputted from the history table memory 111.

As described above, in this embodiment, the history table memory 111 is provided for performing the branch prediction based on the past branch history. Accordingly, the prefetched instruction can be fed to the CPU efficiently even in case of the instruction set having no branch prediction bit. As appreciated, in case of a program which requires execution of a loop in plural times, a hit ratio of the branch prediction is improved. Further, in case of an advance-writable cache device, since update can be continued even when a conditional branch instruction is prefetched, a hit ratio of the device is increased to improve the performance thereof.

In this embodiment, as described above, when the fetch address FA is not found in the history table memory 111, it is arranged that "non-branched" is outputted from the history table memory 111. However, "branched" may be outputted from the history table memory 111 by replacing the AND gate 113 with an OR gate and inverting the output of the comparator 112.

While the present invention has been described in terms of the preferred embodiments, the invention is not to be limited thereto, but can be embodied in various ways without departing from the principle of the invention as defined in the appended claims.

What is claimed is:

1. An instruction prefetch circuit comprising:
   a memory prestoring instructions to be used in a processor, said memory prestoring said instructions corresponding to addresses;
   address generating means for incrementing a first instruction address inputted from said processor so as to generate a prefetch address for sending to said memory;
   data sending means for reading out the instruction corresponding to said prefetch address from said memory and for sending said readout instruction to said processor;
   determination signal generating means for detecting whether or not said prefetch address agrees with a second instruction address inputted from said processor after said first instruction address, said determination signal generating means supplying to said processor a determination signal indicative of said instruction sent from said data sending means being valid when said prefetch address agrees with said second instruction address, while supplying to said processor a determination signal indicative of said instruction sent from said data sending means being invalid when said prefetch address disagrees with said second instruction address; and
   selection signal generating means for sending a selection signal to said address generating means, said selection signal causing said address generating means to select said second instruction address as a new prefetch address other than an address derived by incrementing said first instruction address, only upon change of said determination signal from valid to invalid.

2. An instruction prefetch circuit comprising:
   a memory prestoring instructions to be used in a processor, said memory prestoring said instructions corresponding to addresses;
   address generating means for incrementing a first instruction address inputted from said processor so as to generate a prefetch address for sending to said memory;
   data sending means for reading out the instruction corresponding to said prefetch address from said memory and for sending said read-out instruction to said processor;
   determination signal generating means for detecting whether or not said prefetch address agrees with a second instruction address inputted from said processor after said first instruction address, said determination signal generating means supplying to said processor a determination signal indicative of said instruction sent from said data sending means being valid when said prefetch address agrees with said second instruction address, while supplying to said processor a determination signal indicative of said instruction sent from said data sending means being invalid when said prefetch address disagrees with said second instruction address;
   means for detecting that said instruction sent from said data sending means is an unconditional branch instruction; and
   means for extracting a branch destination address from said unconditional branch instruction;
   said address generating means sending said branch destination address to said memory as a new prefetch address when said instruction sent from said data sending means is the unconditional branch instruction.

3. An instruction prefetch circuit comprising:
   a memory prestoring instructions to be used in a processor, said memory prestoring said instructions corresponding to addresses;
   address generating means for incrementing a first instruction address inputted from said processor so as to generate a prefetch address for sending to said memory;
   data sending means for reading out the instruction corresponding to said prefetch address from said memory and for sending said read-out instruction to said processor;
   determination signal generating means for detecting whether or not said prefetch address agrees with a second instruction address inputted from said processor after said first instruction address, said determination signal generating means supplying to said processor a determination signal indicative of said instruction sent from said data sending means being valid when said prefetch address agrees with said second instruction address, while supplying to said processor a determination signal indicative of said instruction sent from said data sending means being invalid when said prefetch address disagrees with said second instruction address;
   means for detecting that said instruction sent from said data sending means is a conditional branch instruction instructing a conditional branch;
   means for extracting a branch destination address from said conditional branch instruction;
   prediction means for predicting whether or not said conditional branch is actually executed;
   selection means for selecting, based on said branch prediction, one of an address derived by incrementing said first instruction address and said branch destination address; and
   means for outputting, based on a signal indicative of whether said branch prediction fails or not, one of said address selected by said selection means and a third instruction address being inputted from said processor, to said address generating means as a prefetch address.

4. The instruction prefetch circuit according to claim 3, wherein said prediction means extracts a branch prediction bit in an instruction field of said conditional branch instruction and uses it as a prediction value.

5. The instruction prefetch circuit according to claim 3, wherein said prediction means uses a random value as a prediction value.

6. The instruction prefetch circuit according to claim 3, wherein said prediction means includes a table storing a past branch history of the conditional branch instruction, said prediction means deriving a prediction value based on said past branch history.

* * * * *